(12) United States Patent
Chen et al.

(10) Patent No.: US 12,008,260 B2
(45) Date of Patent: Jun. 11, 2024

(54) METHOD OF STORAGE SPACE MANAGEMENT FOR IMPROVING ENDURANCE OF STORAGE DEVICES

(71) Applicant: Realtek Semiconductor Corporation, Hsinchu (TW)

(72) Inventors: Yen-Chung Chen, Hsinchu (TW); Wei-Ren Hsu, Hsinchu (TW); Fu-Hsin Chen, Hsinchu (TW); Ming-Yuh Yeh, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 0 days.

(21) Appl. No.: 18/325,012

(22) Filed: May 29, 2023

(65) Prior Publication Data

US 2023/0305740 A1 Sep. 28, 2023

Related U.S. Application Data

(62) Division of application No. 17/116,095, filed on Dec. 9, 2020, now abandoned.

(30) Foreign Application Priority Data

Feb. 27, 2020 (TW) ................. 109106583

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ............................ G06F 3/0616; G06F 3/0644
See application file for complete search history.

(56) References Cited

U.S. PATENT DOCUMENTS

| | | |
|---|---|---|
| 2013/0227246 A1 | 8/2013 | Hirao et al. |
| 2017/0160976 A1 | 6/2017 | Thangaraj et al. |
| 2020/0117380 A1 | 4/2020 | Chen et al. |
| 2021/0240613 A1 | 8/2021 | Na |

*Primary Examiner* — David Yi
*Assistant Examiner* — Nicholas A. Paperno
(74) *Attorney, Agent, or Firm* — CKC & Partners Co., LLC

(57) ABSTRACT

A storage device includes a controller and a memory. A method of storage space management for the storage device is executed to perform steps as below. The controller calculates an expectedly used capacity and an effective capacity of the memory. The controller determines whether blocks of the memory include one or more blocks that are non-bad blocks and are prohibited from reading/writing. When the one or more blocks are determined to be non-bad blocks and to be prohibited from reading/writing, the controller marks each of the one or more blocks as a restricted block other than a bad block, thereby maintaining the effective capacity to be unchanged. The controller compares difference of the effective capacity and a total capacity of the one or more blocks that are marked as the restricted block to the expectedly used capacity to determine whether to prohibit programming to the memory.

6 Claims, 5 Drawing Sheets

METHOD OF STORAGE SPACE MANAGEMENT FOR IMPROVING ENDURANCE OF STORAGE DEVICES

RELATED APPLICATION

This application is a Divisional application of U.S. application Ser. No. 17/116,095, filed Dec. 9, 2020, which claims priority to Taiwan Application Serial Number 109106583, filed Feb. 27, 2020, which is incorporated herein by reference in its entirety.

BACKGROUND

Technical Field

The present disclosure is related to methods for storage space management. More particularly, the present disclosure is related to methods for storage space management for improving endurance of storage devices.

Description of Related Art

Lifetime of solid state drives (SSDs) is limited by the program/erase (or read/write) cycles of flash memory within the drives. When the program/erase cycle exceeds an upper limit in its design, the flash memory may possibly be unable to adequately store data. In such a case, the control chip of the solid state drive would mark this memory block as a bad block.

When the remaining available memory space of the solid state drive is less than a capacity of the drive initially declared as more and more memory blocks are marked as bad blocks, a legacy memory controller would determine that the solid state drive is up to its lifetime and no longer able to be stored or accessed.

In view of the above, how to extend lifetime of solid state drives is an important issue in the field.

SUMMARY

One aspect of the present disclosure is related to a method of storage space management for a storage device comprising a controller and a memory, the method comprising: calculating, by the controller, an expectedly used capacity and an effective capacity of the memory, wherein the effective capacity has a negative correlation with a number of blocks marked as bad blocks among a plurality of blocks of the memory; when the effective capacity is less than or equal to the declared capacity, and a difference between the effective capacity and the expectedly used capacity is less than a predetermined threshold capacity, prohibiting, by the controller, programming to the memory; and when the effective capacity is less than or equal to the declared capacity and the difference of the effective capacity and the expectedly used capacity is not less than the predetermined threshold capacity, permitting, by the controller, programming to the memory.

One aspect of the disclosure is related to another method of storage space management for a storage device, the storage device comprising a controller and a memory, the method comprising: calculating, by the controller, an expectedly used capacity and an effective capacity of the memory, wherein the effective capacity has a negative correlation with a number of blocks marked as bad blocks in a plurality of blocks of the memory; determining, by the controller, whether each of the plurality of blocks of the memory is in a non-use status; when one of the blocks is determined as in the non-use status, marking the block by the controller as a damaged block or a restricted block, such that the effective capacity is no less than the declared capacity of the storage device; and comparing, by the controller, a difference of the effective capacity and a number of blocks marked as the restricted block to the expectedly used capacity to determine whether to prohibit programming to the memory.

One aspect of the disclosure is related to another method of storage space management for a storage device, the storage device comprising a controller and a memory, the method comprising: storing, by the controller, at least one re-initialization capacity, wherein the at least one re-initialization capacity is less than a declared capacity; calculating, by the controller, an effective capacity, wherein the effective capacity has a negative correlation with a number of blocks among a plurality of blocks of the memory marked as bad blocks; determining, by the controller, based on a difference between the effective capacity and the declared capacity, whether to enable the storage device to re-initialize with the at least one re-initialization capacity.

DETAILED DESCRIPTION

While detailed description would be made below based on embodiments of the disclosure by referring to the attached drawings, the specific embodiments described are merely for explanation purpose, rather than limitation for the disclosure, and the description regarding structure operations is not intended for restricting the order of performing the operations. Any equivalent device resulted from the structures of the elements recombined falls within the scope of the present disclosure.

Figure 1:
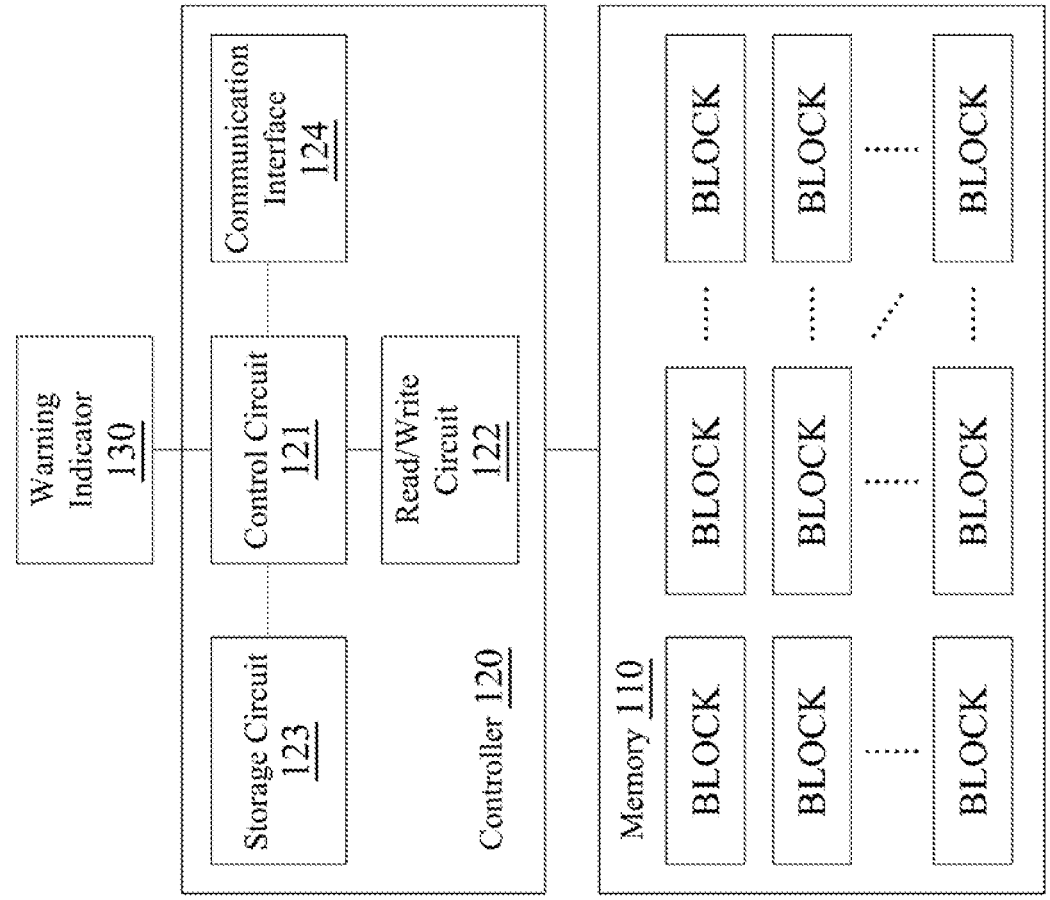
FIG. 1 is a schematic diagram of a storage device according to embodiments of the present disclosure.

Now reference is made to FIG. 1. FIG. 1 is a schematic diagram of a storage device 100 according to embodiments of the present disclosure. As shown in FIG. 1, the storage device 100 includes a memory 110, a controller 120, and a warning indicator 130. The memory 110 comprises a plurality of memory blocks BLOCK. The controller 120 includes a control circuit 121, a read/write circuit 122, a storage circuit 123, and a communication interface 124.

Structurally, the controller 120 is coupled to the memory 110 and the warning indicator 130. The control circuit 121 is coupled to the read/write circuit 122, the storage circuit 123, the communication interface 124, and the warning indicator 130. Specifically, the control circuit 121 is coupled to the memory blocks BLOCK through the read/write circuit 122.

In some embodiments, the memory 110 may be a non-volatile memory, such as a NAND Flash memory array. In some embodiments, the controller 120 may be any of various processing circuits or control chips.

In operation, the control circuit 121 is configured for controlling the read/write circuit 122 for programming, reading, erasing, verifying, or the like of one or more of the memory blocks, as well as for recording/logging the program/erase cycle (P/E cycle, or write/erase cycle) for each of the memory blocks in the storage circuit 123. When a programming operation is performed on the memory block for storing data, the control circuit 121 may calculate, based on the log in the storage circuit 123, a size of the space which currently has data stored therein among all the memory blocks, where the size of the space is the currently used capacity. The control circuit 121 may calculate the sum of the currently used capacity with a size of a data entry to be currently written, where the sum is the expectedly used capacity. For example, if the currently used capacity is 1 TB and a data entry of 0.2 TB is to be written, then the expectedly used capacity is 1.2 TB.

Furthermore, when the control circuit 121 writes/programs to one or more of the memory blocks, the control circuit is configured for determining whether the memory block is marked as a bad block. A block not marked as a bad block is indicative of that cell in this memory block still function normally, while one marked as a bad block is indicative of that this memory block is no longer able to reserve data normally. When the control circuit 121 determines that a given memory block is not able to accurately reserve data, the control circuit 121 would mark the memory block as a bad block.

Specifically, in some embodiments, when the read/write cycle for the memory block is larger than an upper limit for the specified read/write cycle of the memory block in the design specification, the control circuit 121 would determine that the memory block should be marked as a bad block. In some other embodiments, the control circuit 121 verifies the memory block through the read/write circuit. If the memory block fails the verification, the control circuit 121 would determine that the memory block should be marked as a bad block. In this way, the storage device 100 may learn the current effective (available) capacity of the memory 110 by calculating the number of memory blocks not being marked (i.e., those included as part of the space for storing data). In other words, the effective capacity has a negative correlation with the number of memory blocks of the memory 110 which are marked as bad blocks.

Figure 2:
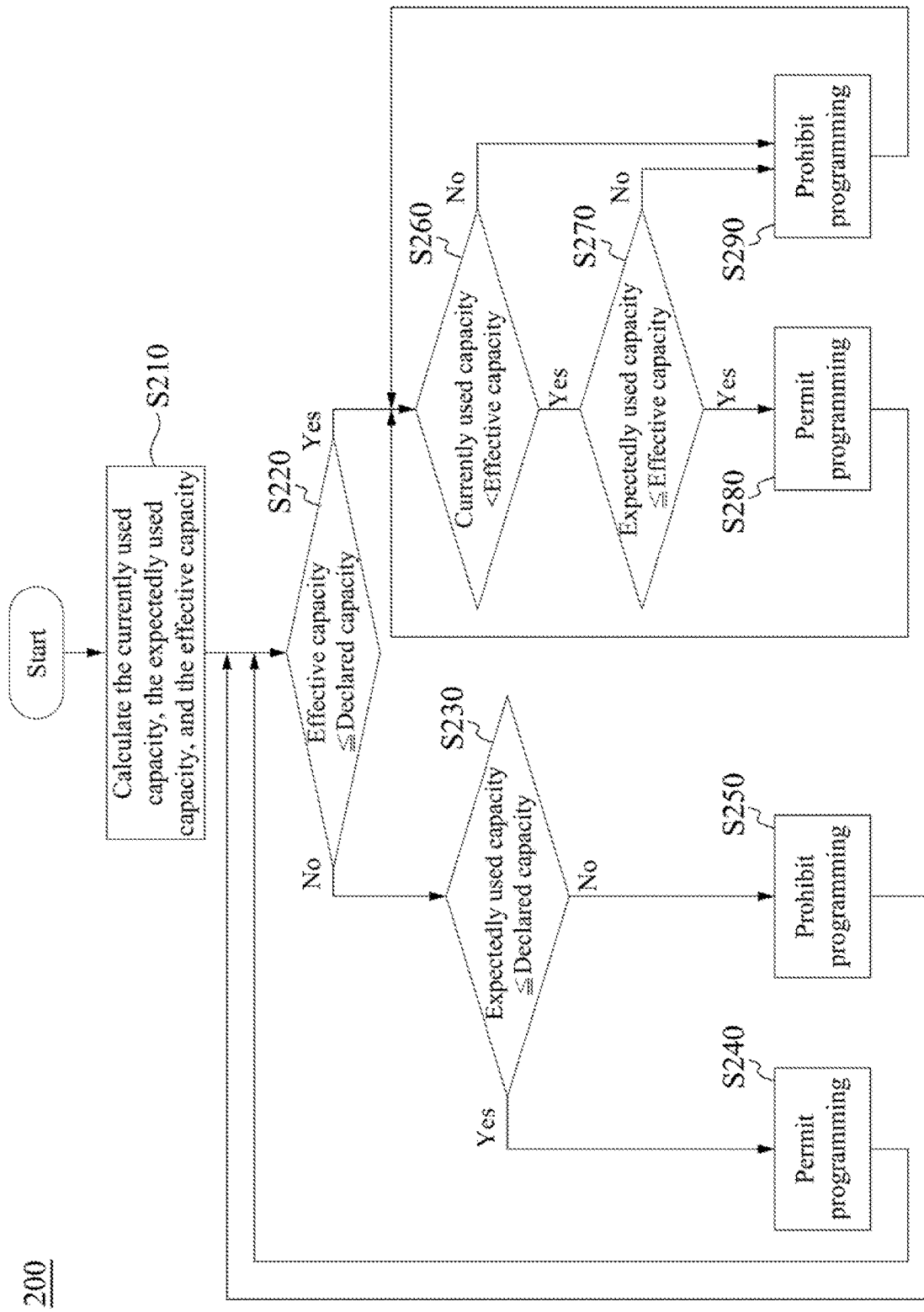
FIG. 2 is a flow chart of a method of storage space management according to embodiments of the present disclosure.

For the ease and clarity of illustration, specific operations of the storage device 100 are described in the following paragraphs by referring to the embodiments shown in FIGS. 1-5, but are not limited as such. Any person skilled in the art may have various modification and alteration to the embodiments without departing from the spirits and scope of the present application. Reference is now made to FIG. 2. FIG. 2 is a flow diagram of a method 200 for storage space management, according to embodiments of the present disclosure. As shown in FIG. 2, the method 200 for storage space management includes operations S210, S220, S230, S240, S250, S260, S270, S280, and S290.

First, in operation S210, a currently used capacity, an expectedly used capacity, and an effective (available) capacity are calculated by the controller 120. Next, in operation S220, the controller 120 determines if the effective capacity is less than or equal to declared capacity.

If the effective capacity is larger than the declared capacity, it means that the memory 110 is not overly damaged or aging so that sufficient effective storage space is still maintained. Therefore, operation S230 is performed, where the controller 120 determines if the expectedly used capacity is larger than the declared capacity.

If the expectedly used capacity is less than or equal to the declared capacity, it means that there are sufficient un-used space in the memory 110 available for programming the current entry of data. Therefore, operation S240 is performed, where programming is permitted.

On the other hand, if the expectedly used capacity is larger than the declared capacity, it means that there is no sufficient un-used space in the memory 110 available for programming the current entry of data. Therefore, the operation S250 is performed, where the controller 120 prohibits programming to the memory 110 and at the same time generates a corresponding signal, thereby generates a corresponding operation for reducing used capacity. The corresponding signal comprises warning notification(s), a safe capacity, the currently used capacity, and a to-be-cleared capacity. The details would be described in the following paragraphs.

Figure 3:
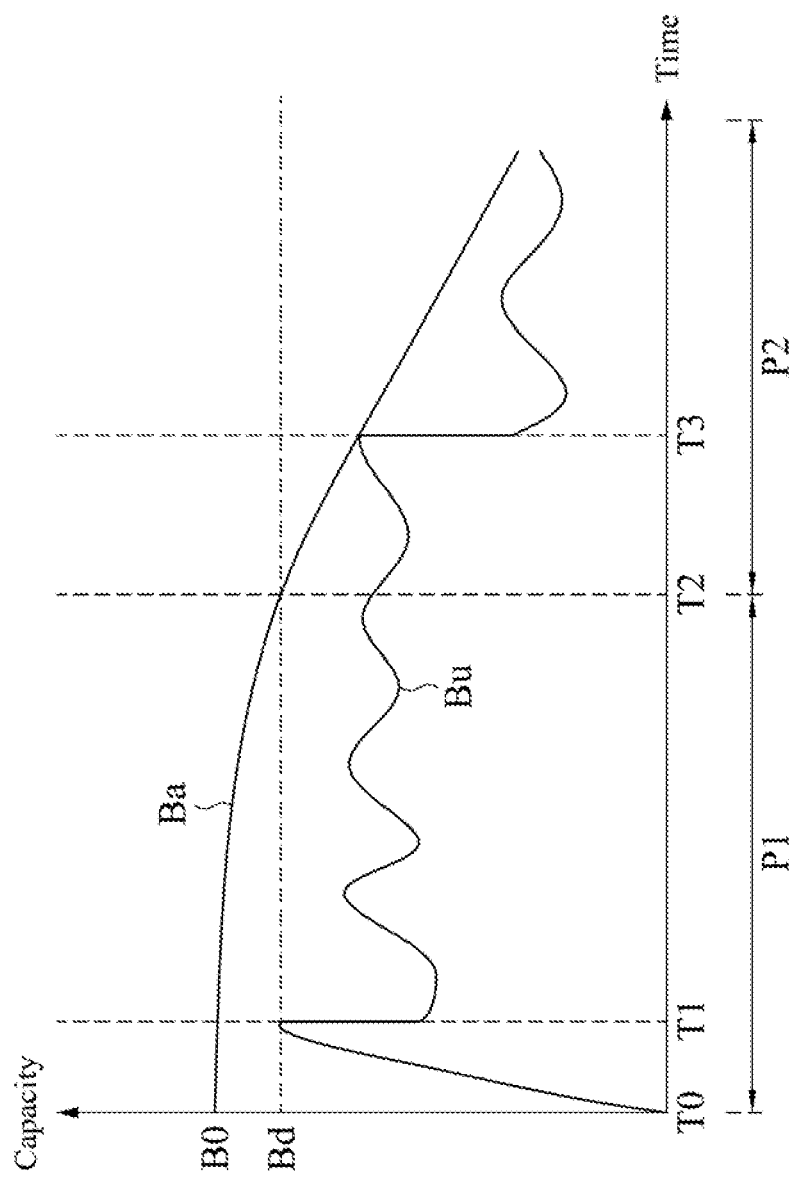
FIG. 3 and FIG. 4 are schematic diagrams showing variation of the capacities of a storage device according to embodiments of the present disclosure.

For instance, as shown in FIG. 3, the horizontal axis represents time and the vertical axis represents capacity. A declared capacity Bd is the initial capacity of the storage device 100 after being initialized (e.g., at the time point T0 in FIG. 3) which a user is able to access (i.e., the nominal capacity in the factory settings). The currently used capacity Bu may increase as the user performing programming operations and decrease as data being deleted/erased. The effective capacity Ba decrements as the number of memory blocks which are marked as bad blocks increases.

At the time point T0, the effective capacity Ba of the storage device 100 is definitely larger than or equal to the declared capacity. For example, for the storage device 100 with the declared capacity Bd of 2.0 TB, the actual capacity B0 of the storage device is 2.2 TB. After the time point T0, the memory 110 starts being programmed to, and therefore the currently used capacity Bu increases from zero.

During the period P1, since the effective capacity Ba is larger than the declared capacity Bd (i.e., the memory 110 is not overly damaged or aging yet, and sufficient effective storage space therefore remains kept), the operations S230-S250 would be performed repeatedly after the operation S220. For example, between the time points T0 and T1, since the expectedly used capacity for each programming to be performed is less than the declared capacity Bd, operations S220, S230, and S240 are therefore repeatedly performed, while programming is permitted so that the currently used capacity Bu continuously increases. Up until the time point T1, the currently used capacity Bu is equal to the declared capacity Bd, meaning that the declared capacity Bd of the memory 110, which is 2 TB, has fully stored with data. At such time, the expectedly used capacity would always exceed the declared capacity no matter how large the new data file to be programmed is; therefore, operation S250 is performed, where programming is prohibited. The operation S220 would not be performed again until the memory 110 is cleared (i.e., with the currently used capacity Bu decreased) to make the currently used capacity Bu less than the declared capacity Bd.

On the other hand, as shown at the time point T2 in FIG. 3, if the effective capacity Ba is equal to the declared capacity Bd, it means that the memory blocks in the memory 110 have been damaged and/or aging to the extent that the size of the remaining effective storage space would be less than the declared capacity Bd. During the period P2, the controller of a legacy storage device would determine the lifetime of the solid state drive is end and no more read/write operation is possible.

In the present disclosure, however, as shown in FIG. 2, in operation S220, if the effective capacity is less than or equal to the declared capacity, the operation S260 would be proceeded with where the controller 120 determines whether the currently used capacity is less than the effective capacity. If the currently used capacity is larger than or equal to the effective capacity, the operation S290 is proceeded with where programming is prohibited. If the currently used capacity is less than the effective capacity, the operation S270 is proceeded with where the controller 120 determines whether the expectedly used capacity is less than or equal to effective capacity.

If the expectedly used capacity is less than or equal to the effective capacity, the operation S280 is performed where programming is permitted. On the other hand, if the expectedly used capacity is larger than the effective capacity, the operation S290 is performed where programming is prohibited.

For instance, as shown in FIG. 3, after the time point T2, even if the effective capacity Ba is less than or equal to declared capacity Bd (for example, the effective capacity Ba is 1.8 TB, not as large as the declared capacity Bd of 2 TB initially), the effective capacity Ba would still be sufficient for storing data of the currently used capacity Bu as normal since the used capacity Bu (e.g., 1.5 TB) is not larger than or equal to the effective capacity Ba (e.g., 1.8 TB). Furthermore, the operation S280 would be able to be proceeded to permit programming as long as the expectedly used capacity is no larger than the effective capacity Ba.

At the time point T3, however, since the currently used capacity Bu would exceed the effective capacity Ba, the stored data contents in the currently used capacity Bu may not be accurately stored; the operation S290 would therefore be executed to prohibit programming. Only after the memory 110 is cleared to make the used capacity Bu less than the declared capacity Bd again (for example, after the time point T3), the operation S270 is performed to determine whether the programming for the current entry of data is permitted.

In this way, even if the effective capacity Ba is less than the declared capacity Bd supposedly existing because the memory blocks in the storage device 100 memory block are aging or damaged, the determination to permit or prohibit programming for extending the endurance of the storage device 100 may still be made by determining the space size of the effective capacity Ba actually available, the currently used capacity Bu, and the expectedly used capacity. For the example of FIG. 3, at the time point T2 where the effective capacity Ba decrements from 2.2 TB to the declared capacity Bd 2.0 TB, the currently used capacity Bu is about 1.5 TB. Even though the currently used capacity Bu is 0.5 TB away from the declared capacity Bd, a common storage device would be unable to operate normally since the effective capacity Ba has been decremented to the declared capacity Bd. For the present disclosure, on the other hand, after the time point T2, although the effective capacity Ba has been decremented to be less than the declared capacity Bd, as long as there is still remaining space between the effective capacity Ba and the currently used capacity Bu, writing, erasing, and the like operations would be enabled, and the lifetime of the storage device 100 would therefore be significantly extended.

In a further embodiment, with the reference made to FIG. 3, during the period P2, the effective capacity Ba' may remain no less than the declared capacity Bd. Specifically, the control circuit 121 would mark the memory blocks unable to accurately store data as "bad blocks" during the period P1, where the number of memory blocks marked as bad blocks is about the difference between the actual capacity BO and the effective capacity Ba. On the other hand, the control circuit 121 would mark the memory blocks unable to accurately store data as "restricted blocks" during the period P2, where the number of memory blocks marked as "restricted blocks" is about the difference between the declared capacity Bd and the effective capacity Ba. Blocks which are marked as "restricted blocks" are the memory blocks to which reading/writing is prohibited. However those memory blocks marked as restricted blocks are not accounted into the amount of "bad blocks" but rather in the amount of "non-bad blocks" (i.e., the effective capacity Ba'). In other words, the control circuit 121 causes the memory blocks which are not able to accurately store data and therefore marked as "restricted blocks" during the period P2 to have the substantial effects as the "bad blocks" (i.e., to which reading/writing is prohibited) but are not counted in the amount of the "bad blocks" (i.e., accounted into the effective capacity Ba'). That is, if one of the memory blocks is determined as in the non-use status, the controller 121 would mark this memory block as a damaged block based on the effective capacity Ba' being larger than the declared capacity Bd, and otherwise mark this memory block as a restricted block based on the effective capacity Ba' being equal to the declared capacity Bd. As a result, during the period P2 the controller 120 of the storage device 100 in the present disclosure may still be able to make the effective capacity Ba' no less than the declared capacity Bd of the storage device 100.

A simple implementation is described below in the perspective of the controller 120. During the period P1, the control circuit 121 directly marks those memory blocks which are determined as requiring to be marked as "bad blocks" as "bad blocks." Moreover, during the transition from the period P1 to the period P2, the control circuit 121 starts to alternatively mark the memory blocks determined as required to be marked as "bad blocks" as "restricted blocks," so as to achieve the effects as described above. It may be seen from the above description that, the number of the blocks marked as "bad blocks" is not larger than the difference between the actual capacity BO and the declared capacity Bd in order to ensure the effective capacity Ba' no less than the declared capacity Bd (such as shown in FIG. 3), wherein the effective capacity Ba' is equal to the effective capacity Ba of those memory blocks with normal reading/writing capability plus the capacity of the memory blocks which are marked as "restricted blocks."

In another embodiment, the control circuit 121 has a table of declared capacities. The table of declared capacities contains a plurality of declared capacities (such as 2.0 T, 1.0 T, 512 G, 500 G, 480 G, 250 G, and etc.) and/or other related information of the corresponding capacities. When the control circuit 121 finds the effective capacity Ba less than or equal to the declared capacity Bd (as shown after the time point T2 of FIG. 3), the control circuit 121 would, under the permission of the user, choose one new (and smaller) capacity in the table of declared capacities for initialization operation, such that the declared capacity Bd may gradually decrease to achieve the effects of the extended lifetime for the storage device 100.

In some of the other embodiments, in operation S290, the control circuit 121 in the controller 120 may transmit a warning signal to the warning indicator 130 to cause the warning indicator 130 to sound an alarm or flash a warning light based on the warning message, in order to notify the user that the current effective capacity Ba is lower than the declared capacity Bd and the memory 110 is in a status where programming is prohibited. Alternatively, the control circuit 121 may send a warning signal to an electronic device through a communication interface 124, and the warning notification is displayed in the electronic device.

Furthermore, in some embodiments, the control circuit 121 in the controller 120 calculates a corresponding capacity for precaution based on the effective capacity Ba. If the effective capacity Ba is less than or equal to declared capacity Bd, and the currently used capacity Bu is larger than or equal to the capacity for precaution or the expectedly used capacity is larger than the capacity for precaution, the control circuit 121 of the controller 120 sends a precaution signal to the warning indicator 130, or sends the precaution signal to the electronic device through the communication interface 124. For example, when the current effective capacity Ba is 1.8 TB, the capacity for precaution may be 1.7 TB to keep a storage space of 0.1 TB for reminding the user. The warning indicator 130 may correspondingly flash lights of different colors, in different frequencies, or flash a different number of lights based on the warning signal and the precaution signal.

Figure 4:
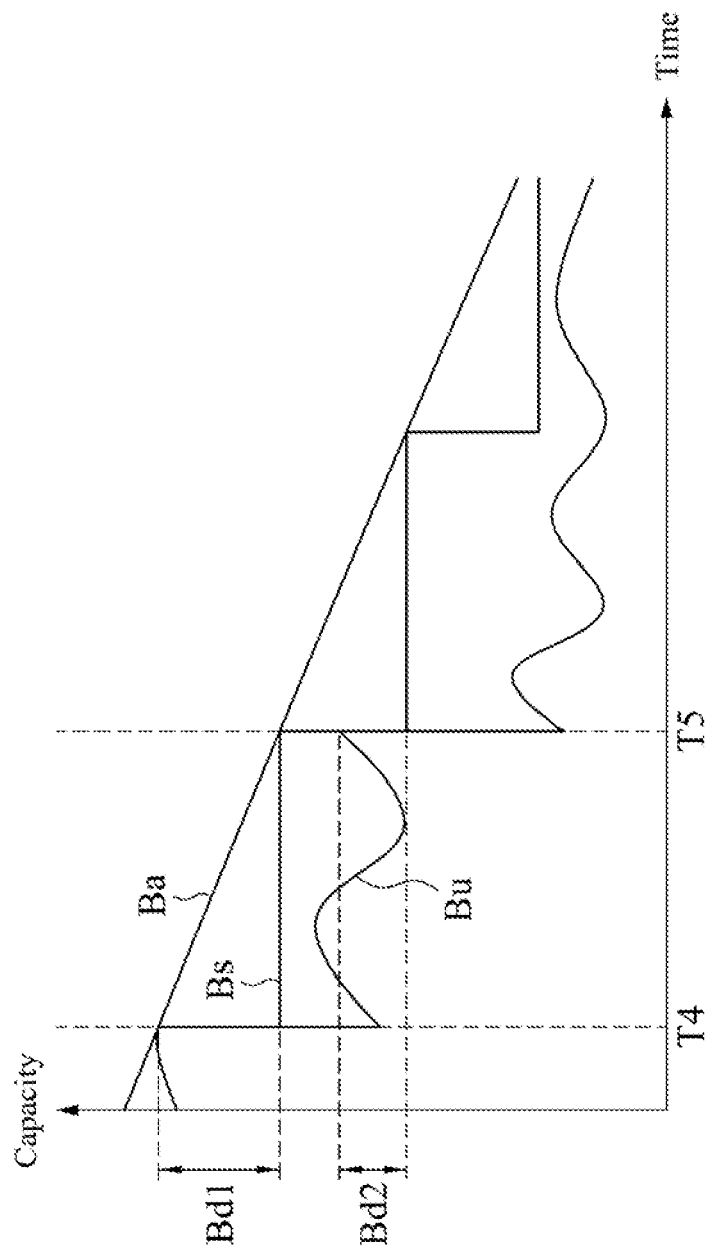

Additionally, when the effective capacity Ba is less than the declared capacity Bd in some embodiments, the controller 120 is further configured for calculating a safe capacity based on the effective capacity Ba. In other words, in operations S260 and S270, the controller 120 is configured to determine whether the currently used capacity Bu is less than the safe capacity and whether the expectedly used capacity is less than or equal to the safe capacity. Specifically, as shown in FIG. 4, when the effective capacity Ba is decremented to the declared capacity Bd (i.e., at the time point T4), the control circuit 121 would define a safe capacity Bs by deduct a predetermined capacity from the effective capacity Ba. Moreover, every time when the effective capacity Ba is decremented to this safe capacity Bs (e.g., at the time point T5), the control circuit 121 would further deduct a predetermined capacity from the effective capacity Ba as the new safe capacity Bs. In other words, the safe capacity Bs is equal to the effective capacity Ba minus a predetermined threshold capacity.

In this way, when the effective capacity Ba is less than the declared capacity Bd, by means of the safe capacity Bs it may be avoided that the difference of the currently used capacity Bu with the effective capacity Ba too small to accurately store data. Furthermore, when the currently used capacity Bu is not sufficiently cleared, with use of the safe capacity Bs the storage device 100 may be prevented from sending warning signals too frequently.

It is to be noted that, while the predetermined capacities to be deducted each time illustrated in FIG. 4 are equivalent, the predetermined capacity to be deducted each time may increase as the effective capacity Ba decrements in some other embodiments. For example, the predetermined capacity to be deducted may be 0.1 TB, 0.2 TB, 0.3 TB, and so on, and the safe capacity is 1.9 TB, 1.7 TB, 1.4 TB, and so on. In other words, the safe capacity is adjustable. The safe capacity is proportional to the effective capacity.

In the embodiments described above, it is determined by the controller 120 of the storage device 100 as for whether programming to the memory 110 is prohibited, and the current status is presented by the warning indicator 130 of the storage device 100. In some other embodiments, the control circuit 121 of the storage device may communicate with another electronic device through the communication interface 124 to cause an electronic device 300 to determine whether programming is prohibited, and also display related information accordingly.

Figure 5:
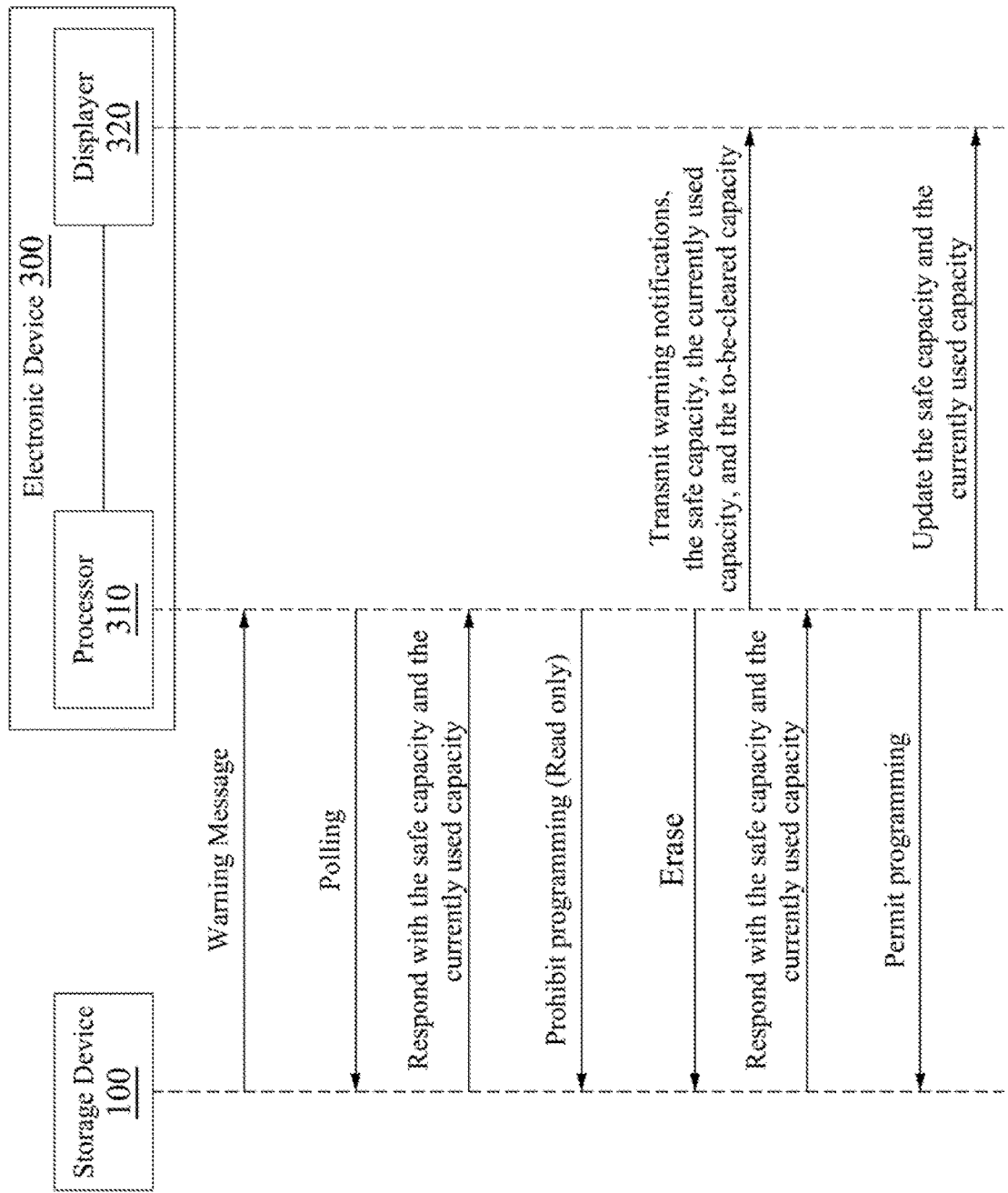
FIG. 5 is a flow diagram illustrating message transmission between a storage device and an electronic device according to embodiments of the present disclosure.

Specifically, as shown in FIG. 5, when the storage device 100 sends out a warning message, a processor 310 in the electronic device 300 would performs polling according to the warning message. The storage device 100 in response to the polling would respond with the current effective capacity Ba and the currently used capacity Bu. The processor 310 would decide whether programming is to be prohibited based on the safe capacity Bs and the currently used capacity Bu or the expectedly used capacity. If the currently used capacity Bu or the expectedly used capacity is larger than the safe capacity Bs, the processor 310 would calculate a to-be-cleared capacity based on the safe capacity Bs and the currently used capacity Bu or the expectedly used capacity, and/or provide a list of data recommended to be deleted or backed up to the cloud, also transmit warning notifications, the safe capacity Bs, the currently used capacity Bu, the expectedly used capacity, and the to-be-cleared capacity to a displayer 320.

Specifically, as shown at the time point T4 in FIG. 4, when the currently used capacity Bu is about to be larger than the safe capacity Bs, the processor 310 would use the difference between the currently used capacity Bu with the safe capacity Bs as a to-be-cleared capacity Bd1. For a further example, at the time point T5, the processor 310 would use the difference of the currently used capacity Bu and the safe capacity Bs as a to-be-cleared capacity Bd2.

Next, as shown in FIG. 5, if the processor 310 performs erasing operation to the storage device 100, the currently used capacity Bu of the storage device 100 would be lowered. With the storage device responds with the safe capacity Bs and the currently used capacity Bu again, the processor 310 may permit programming again if the currently used capacity Bu is less than the safe capacity Bs, and also update the safe capacity Bs along with the currently used capacity Bu to the displayer 320.

In such way, the user may be notified by the electronic device 300 of how much space of the effective capacity Ba of the storage device 100 currently has, which is not as much as the declared capacity Bd but in fact available to use. In addition, with continuous monitoring, the user may be reminded of how many files are suggested to be deleted in order to free up enough effective capacity Ba for accuracy of the data storage.

In sum, by means of the method 200 for storage space management, when the effective capacity Ba is not as much as the declared capacity Bd, programming would be temporarily prohibited if the currently used capacity Bu or the expectedly used capacity is about to exceed the effective capacity Ba, and programming would be permitted again if the expectedly used capacity is not as large as the effective capacity Ba. Therefore, the lifetime of the storage device 100 may be extended under the condition of ensuring data to be accurately stored.

While the present disclosure has been disclosed as in the Detailed Description above, it is not intended to limit the present disclosure as such. Those skilled in the art can make various alternation and modifications to the embodiments without departing from the spirit and scope of the present disclosure. Therefore, it is intended that the protection scope of the present disclosure is defined by the following claims.

What is claimed is:

1. A method of storage space management for a storage device, the storage device comprising a controller and a memory, the storage device having a declared capacity, the method of storage space management comprising:

calculating, by the controller, an expectedly used capacity and an effective capacity of the memory, wherein the effective capacity decreases a number of blocks marked as bad blocks in a plurality of blocks of the memory increases, wherein the expectedly used capacity is a sum of a currently used capacity of the memory and a size of a data entry to be currently written into the memory;

determining, by the controller, whether the plurality of blocks of the memory include one or more blocks that are non-bad blocks and are prohibited from reading/writing;

when the one or more blocks are determined to be non-bad blocks and to be prohibited from reading/writing, marking, by the controller, each of the one or more blocks as a restricted block other than a bad block, thereby maintaining the effective capacity to be unchanged; and comparing, by the controller, a difference of the effective capacity and a total capacity of the one or more blocks that are marked as the restricted block to the expectedly used capacity to determine whether to prohibit programming to the memory.

2. The method of claim 1, further comprising:

when the effective capacity is larger than the declared capacity, marking one of the blocks by the controller as the bad block if the one of the blocks is determined to be non-bad block and to be prohibited from reading/writings; and when the effective capacity is equal to the declared capacity, marking one of the blocks by the controller as the restricted block if the one of the blocks is determined to be non-bad block and to be prohibited from reading/writing.

3. The method of claim 1, further comprising:

when the expectedly used capacity is larger than the difference of the effective capacity and the total capacity of the one or more blocks marked as the restricted block, prohibiting, by the controller, programming to the memory; and when the expectedly used capacity is not larger than the difference of the effective capacity and the total capacity of the one or more blocks marked as the restricted block, permitting, by the controller, programming to the memory.

4. The method of claim 1, further comprising:

sending a warning signal by the controller when the expectedly used capacity is larger than the difference of the effective capacity and the total capacity of the one or more blocks marked as the restricted block.

5. The method of claim 1, further comprising:

when the expectedly used capacity is larger than the difference of the effective capacity and the total capacity of the one or more blocks marked as the restricted block, transmitting, by the controller, a warning signal, the expectedly used capacity, and the difference of the effective capacity and the total capacity of the one or more blocks marked as the restricted block to an electronic device; and prohibiting, by the electronic device, programming to the memory and displaying a to-be-cleared capacity in response to the warning signal.

6. The method of claim 1, wherein the declared capacity is an initial capacity of the storage device after being initialized.

* * * * *